(12) United States Patent
Farrar et al.

(10) Patent No.: US 6,426,382 B1
(45) Date of Patent: Jul. 30, 2002

(54) POLYCATIONIC POLYMER SALTS, THEIR PRODUCTION AND USE

(75) Inventors: John Farrar; Mark Graham, both of Leeds; Andrew Jackson, Harrogate, all of (GB)

(73) Assignee: Clariant Finance (BVI) Limited, Tortola (BB)

(*) Notice: Subject to any disclaimer, the term of this patent is extended or adjusted under 35 U.S.C. 154(b) by 0 days.

(21) Appl. No.: 09/720,305

(22) PCT Filed: Jun. 21, 1999

(86) PCT No.: PCT/IB99/01159

§ 371 (c)(1),
(2), (4) Date: Dec. 21, 2000

(87) PCT Pub. No.: WO99/67317

PCT Pub. Date: Dec. 29, 1999

(30) Foreign Application Priority Data

Jun. 22, 1998 (GB) ............................................. 9813248

(51) Int. Cl.⁷ ............................... C08J 3/03; C08J 3/07
(52) U.S. Cl. ........................ 524/815; 524/800; 528/403; 528/421; 528/482
(58) Field of Search ................. 524/815, 800; 528/403, 421, 482

(56) References Cited

U.S. PATENT DOCUMENTS 4,599,087 A * 7/1986 Heller et al. .................... 8/495
4,888,128 A   12/1989 Koll et al.

FOREIGN PATENT DOCUMENTS

| GB | 1 239 276 | 7/1971 |
| GB | 1 313 469 | 4/1973 |
| GB | 1 471 193 | 4/1977 |
| JP | 62-106965 | 5/1987 |
| JP | 63-282382 | 11/1988 |
| WO | 96/00221 | 1/1996 |

OTHER PUBLICATIONS

English abstract for JP 62–106965, May 18, 1987.
English abstract for JP 63–282382, Nov. 18, 1988.
Rev. Prog. Coloration, vol. 17, 1987, pp. 46–47.

* cited by examiner

Primary Examiner—Duc Truong
(74) Attorney, Agent, or Firm—Scott E. Hanf

(57) ABSTRACT

Aqueous solutions of polycationic polymers ($P_{AB}$) containing quaternary ammonium groups in salt form as heteroatomic chain members or ring members of the polymer, wherein a part of the counter-ions to the quaternary cationic groups are anionic groups of anionic optical brighteners, containing at least one anionic group, are valuable multifunctional agents in papermaking.

9 Claims, No Drawings

POLYCATIONIC POLYMER SALTS, THEIR PRODUCTION AND USE

BACKGROUND OF THE INVENTION

In U.S. Pat. No. 4,718,918 there is described a process for dyeing or optically brightening textile material, in which before or after dyeing or optical brightening the textile material is treated with a certain cationic polymer; although in the generic description there is also mentioned that the polymer may also be added simultaneously, there is no particular description or exemplification of this variant. From U.S. Pat. No. 4,695,405 there are known certain polycationic polymers containing a nitro group and aromatic or heteroaromatic rings, which serve as fluorescence quenchers. From U.S. Pat. No. 3,909,441 there are known compositions containing complexes of certain vinylic polymers and a very low proportion of optical brightener, which are used in dispersion in certain binders in UV filter layers in photography.

SUMMARY OF THE INVENTION

In the production of paper it is usual to employ retention agents, dewatering agents and/or fixatives in order to improve the speed of production or other properties and yield of the product. These adjuvants are mostly of cationic character, and if it is desired to produce an optically brightened paper, care should be taken that with the use of an anionic optical brightener there does not occur a precipitation by interaction of the anionic and cationic substances. In order to avoid such an undesirable precipitation, the cationic agents are usually added at a sufficient time after the addition of the anionic component, either within a very short time range immediately before sheet formation (i.e. a few seconds before conveying the pulp to the paper sheet forming part of the assembly) or after sheet formation.

DESCRIPTION OF THE PREFERRED EMBODIMENTS

It has now surprisingly been found that a certain combination of anionic optical brighteners with certain polycationic polymers, as defined below, in aqueous solution, especially in concentrated aqueous solution, is of unexpected stability and provides a valuable multi-functional agent that combines the activity of optical brighteners and of the cationic polymers (e.g. as retention assistant, drainage assistant or fixative in paper production), which in the production of optically brightened paper allows the addition of optical brightener together with the cationic polymer, e.g. by adding it to the stock at any time before sheet formation.

The invention relates to the defined aqueous solutions, their production and use.

The invention thus provides an aqueous solution of a polycationic polymer ($P_{AB}$) containing quaternary ammonium groups in salt form as heteroatomic chain members or ring members of the polymer, wherein a part of the counter-ions to the quaternary cationic groups are anionic groups of anionic optical brighteners, containing at least one anionic group.

The above ($P_{AB}$)-solutions can be prepared in a very easy way, by mixing of at least one suitable anionic optical brightener with a suitable polycationic polymer, containing quaternary ammonium groups in salt form as heteroatomic chain members or ring members of the polymer, in suitable proportion, in aqueous solution.

The process for the production of an aqueous solution of a polycationic polymer ($P_{AB}$) as defined above is in particular characterised in that an aqueous solution of (B) an anionic optical brightener in free acid or alkali metal salt form is added to an aqueous solution of ($P_A$) a polycationic polymer containing quaternary ammonium groups in salt form as heteroatomic chain members or ring members of the polymer, in which the counter-ions to the cationic quaternary ammonium groups are anions of mineral acids, anions of low molecular carboxylic acids or anions deriving from a quaternizing agent, in such an equivalents ratio that the quaternary ammonium cationic groups in ($P_A$) are in excess over the anionic groups in (B) and the obtained product ($P_{AB}$) is in the form of an aqueous solution.

As (B) there may be employed any anionic optical brightener that is water soluble in the form of its alkali metal salt, in particular anionic optical brighteners suitable for the optical brightening of paper, advantageously containing 2 to 10 anionic groups, preferably 4 to 10 anionic groups, the anionic groups being preferably sulphonate groups and/or carboxylate groups, e.g. 2 to 8, more preferably 2 to 6, sulphonate groups and optionally 2 to 4 carboxylate groups. Anionic optical brighteners, especially those suitable for the optical brightening of paper, are well known in the art and also described in the specialised literature. Preferred categories of optical brighteners are those of the diaminostilbene, bisstilbyl (also referred to as bis styryl biphenyl) or 1,3-diphenylpyrazoline series, e.g. of the following formulae:

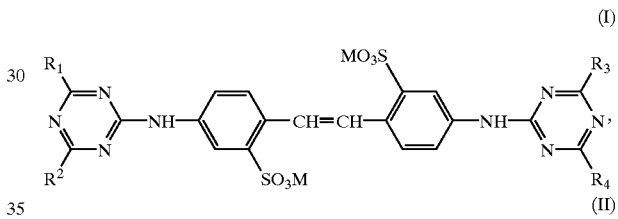

(I)

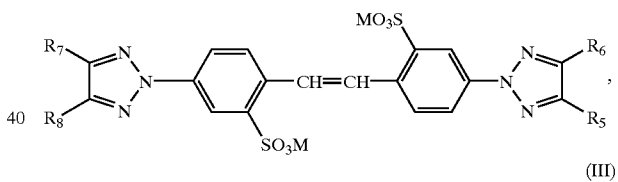

(II)

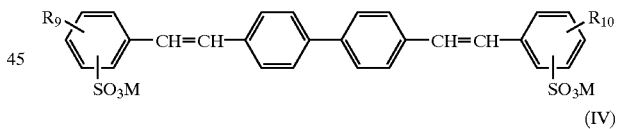

(III)

and

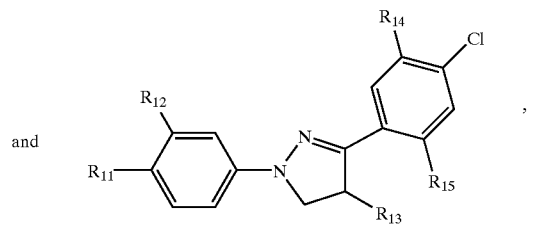

(IV)

wherein
  $R_1$, $R_2$, $R_3$ and $R_4$ signify, independently from each other, the radical of an amine or of an alcohol,
  $R_5$ and $R_7$ signify, independently from each other, $C_{1-2}$-alkyl, phenyl or sulphophenyl,
  $R_6$ and $R_8$ signify, independently from each other, hydrogen, $C_{1-2}$-alkyl, phenyl or sulphophenyl,
  $R_9$ and $R_{10}$ signify, independently from each other, hydrogen, $C_{1-2}$-alkyl or -alkoxy, chlorine or —$SO_3M$, $R_{11}$, signifies a radical of formula —$SO_2$—$(NH)_m$—($C_{2-4}$-alkylene)—$SO_3M$, m signifies zero or one, $R_{12}$ signifies hydrogen, $R_{13}$ signifies hydrogen or —$CH_2$—$SO_3M$, $R_{14}$ signifies hydrogen or chlorine, $R_{15}$ signifies hydrogen or, if $R_{14}$ signifies chlorine, also methyl and M signifies hydrogen or an alkali metal cation, with the proviso that formula (IV) contains at least one sulpho group in at least one of $R_{11}$, and $R_{12}$, In the significances of $R_1$, $R_2$, $R_3$ and R4 the radical of an alcohol is preferably the radical of an aliphatic alcohol or of a phenol. The radical of the aliphatic alcohol is preferably $C_{1-4}$-alkoxy, the phenol radical is preferably unsubstituted phenoxy. The amine radical is preferably optionally substituted anilino or an aliphatic aminogroup —$NR_0'R_0''$, wherein $R_0'$ signifies hydrogen, $C_{1-4}$-alkyl, benzyl, $C_{2-3}$-hydroxyalkyl or carboxy-($C_{1-4}$-alkyl), $R_0''$ signifies hydrogen, $C_{1-4}$-alkyl, $C_{2-3}$-hydroxyalkyl, sulpho-$C_{1-3}$-alkyl, sulpho-$C_{3-4}$-hydroxyalkyl, cyano-($C_{1-3}$-alkyl), carbamoyl-($C_{1-3}$-alkyl), carboxy-($C_{1-4}$-alkyl), carboxy-[cyano-($C_{2-3}$-alkyl)], carboxy-[carbamoyl-($C_{2-3}$-alkyl)] or dicarboxy-($C_{2-3}$-alkyl), or $R_0'$ and $R_0''$ together with the nitrogen to which they are linked form a heterocycle, $R_1$ and $R_3$ preferably signify an optionally substituted anilino group of formula

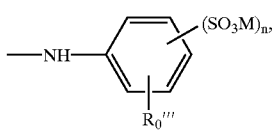

(a)

wherein $R_0'''$ signifies hydrogen, methyl, methoxy or chlorine, preferably hydrogen, and n signifies 0, 1 or 2, or an aliphatic aminogroup —$NR_0'R_0''$, $R_0'$ preferably signifies $C_{1-2}$-alkyl, benzyl, $C_{2-3}$-hydroxyalkyl or carboxy-($C_{1-2}$-alkyl).

$R_0''$ preferably signifies $C_{2-3}$-hydroxyalkyl, carbamoyl-($C_{1-3}$-alkyl), cyano-($C_{1-3}$-alkyl) or carboxy-($C_{1-2}$-alkyl).

If $R_0'$ and $R_0''$ together with the nitrogen to which they are linked form a heterocycle, this is preferably a morpholine ring or a carboxypyrrolidine ring, $R_2$ and $R_4$ preferably signify methoxy, phenoxy or more preferably an aliphatic aminogroup —$NR_0'R_0''$, The two symbols $R_1$ and $R_3$ in formula (I) may have the same significance or different significances. Preferably they have the same significance.

Similarly also the two symbols $R_2$ and $R_4$ in formula (I) may have the same significance or different significances. Preferably they have the same significance.

$R_5$ and $R_7$ preferably signify phenyl or sulphophenyl.

$R_6$ and $R_8$ preferably signify hydrogen or $C_{1-2}$-alkyl.

The two symbols $R_5$ and $R_7$ in formula (II) may have the same significance or different significances. Preferably they have the same significance.

Similarly also the two symbols $R_6$ and $R_8$ in formula (II) may have the same significance or different significances. Preferably they have the same significance.

The two sulpho groups shown in formula (III) with a floating bond and which do not belong to a significance of $R_9$ and $R_{10}$ are preferably in the respective positions ortho to the ethylene radical.

If the two symbols $R_9$ and $R_{10}$ have a significance other than hydrogen, they are preferably in the positions meta or para to the ethylene radical. Preferably $R_9$ and $R_{10}$ signify hydrogen.

$R_{12}$ and $R_{13}$ preferably signify hydrogen.

If the alkylene bridge in the significance of $R_{11}$, contains 3 or 4 carbon atoms, it is preferably branched.

The above optical brighteners are known or may be produced by known methods analogously to known brighteners. Anionic optical brighteners of the diaminostilbene and bisstilbyl series are described e.g. in U.S. Pat. No. 4,888,128, anionic optical brighteners of the 1,3-diphenylpyrazoline series are described e.g. in Rev. Prog. Coloration, Vol 17, 1987, pages 46–47. Optical brighteners of the bistriazinylaminostilbene disulphonic acid series, in particular of formula (I), are described e.g. in WO 96/00221 A1, in GB-A 1239276, 1313469 and 1471193 and in Japanese Kokais JA 62-106965 A2 and JA 63-282382 A2. Among the above optical brighteners are preferred those of formula (I), e.g. with 2 to 10 sulpho groups, in particular those containing 2 to 8, preferably 4 to 6, —$SO_3M$ groups, e.g. those described in WO 96/00221 A1.

M is preferably an alkali metal cation or hydrogen, in particular lithium, sodium and/or potassium or any combination.

The optical brighteners (B) may be employed in any form as commercially available, e.g. as powders or granules, which may be dissolved in water before combination with $(P_A)$ or, with particular advantage, they may be employed in the form of an aqueous solution directly from production.

The quaternary ammonium groups in $(P_A)$ are covalently linked to at least two carbon atoms of the polymer. The polymers $(P_A)$ are advantageously of aliphatic character. They may contain further heteroatoms, in particular oxygen atoms and/or non-quaternary amino groups. The heteroatoms in the polymer are preferably at a distance of 2 to 6 carbon atoms from each other.

The polymers $(P_A)$ are preferably epichlorohydrin derived polyquaternary polymers, in particular reaction products of epichlorohydrin or of epichlorohydrin derivatives with amines, preferably secondary and/or tertiary amines, more preferably under conditions leading to at least partial crosslinking.

The epichlorohydrin-derived polymers are preferably polyquaternary, advantageously crosslinked polymers obtainable by a two- or three-stage synthesis, in which in the first stage epichlorohydrin is reacted with a hydroxy and/or primary or secondary amino compound to give a chloroterminated adduct, and then reacting the chloroterminated adduct with an at least bifunctional secondary or tertiary amine in order to obtain a preferably crosslinked product with quaternary ammonium groups in the polymer structure; if any terminal chlorine is still present in the reaction product, this may be reacted e.g. with a monofunctional tertiary amine.

As starting hydroxy and/or primary or secondary amino compounds there may be employed preferably aliphatic compounds, e.g. mono- or poly-functional alcohols, ammonia, primary aliphatic amines with preferably one to six carbon atoms and which, if containing 2 to 4 carbon atoms, may optionally contain a hydroxygroup as a substituent, secondary aliphatic amines with 1 to 6 carbon atoms in each aliphatic radical, and which, if the radical contains 2 to 4 carbon atoms, may also be substituted with hydroxy, aliphatic unsubstituted oligoamines with 2 to 4 carbon atoms in each alkylene bridge, or also oligoamines with an alkanol group as a substituent.

Suitable hydroxy compounds are primary $C_{1-4}$-alcohols, bi- to hexa-functional aliphatic alcohols with up to six, preferably three to six, carbon atoms in the hydrocarbon radical, in particular of the following formula $$X-(OH)_{x1} \tag{Va}$$

in which

X signifies the x1-valent radical of a $C_{3-6}$-alkane and x1 signifies a number from 3 to the number of carbon atoms in X, or a mixture of oligohydroxyalkanes of formula (Va), or a mixture one or more oligohydroxyalkanes of formula (Va), with a $C_{2-3}$-alkanediol.

or polyalkyleneglycols, in particular of the average formula $$HO-(Alkylene-O)_{x2}-H \tag{Vb}$$

wherein

Alkylene signifies $C_{2-4}$-alkylene and x2 signifies a number from 2 to 40.

Preferred compounds of formula (Va) are those of formula $$H-(CHOH)_{x1}-H \tag{Va'}$$

with x1 being 3 to 6.

Alkylene in formula (Vb) is ethylene, propylene and/or butylene and the polyalkyleneglycols of formula (Vb) may be homo- or copolymers, preferably water soluble products (with a solubility in water of at least 10 g/l at 20° C. and pH 7). As polyalkyleneglycols of formula (Vb) there are preferably employed polyethyleneglycols or copolyalkyleneglycols containing a prevailing molar proportion of ethyleneoxy-units. More preferably there are employed polyethyleneglycols, i.e. compounds of formula (Vb) in which Alkylene signifies only ethylene.

Suitable mono- or oligo-functional amines with a primary and/or a secondary amino group are for instance mono- or di-($C_{1-4}$-alkyl)-amines, mono- or di-($C_{2-4}$-hydroxyalkyl)-amines and oligoamines with 2 to 4 carbon atoms in the alkylene bridge, such as mono- or di-methyl-amine, mono- or di-ethyl-amine, mono- or di-isopropyl-amine, mono- or di-ethanol-amine, mono- or di-isopropanol-amine, ethylenediamine, propylenediamine, butylenediamine, diethylenetriamine, triethylenetetramine, tetraethylenepentamine and N-(2-aminoethyl)-ethanolamine.

By the reaction of the hydroxy and/or primary or secondary amino groups with the epichlorohydrin the epoxy ring of the epichlorohydrin is opened and a corresponding adduct is formed which contains a 2-hydroxy-3-chloropropyl-1 radical. This reaction is preferably carried out in the absence of any other solvent and, especially for hydroxy, in the presence of a catalyst, which is e.g. a Lewis acid, preferably boron trifluoride e.g. in the form of its etherate or acetic acid complex. This reaction is exothermic and the epichlorohydrin reacts with the available hydroxy or amino groups and, as reaction proceeds, may also react with a hydroxy group of a 2-hydroxyl-3-chloropropyl-1 radical formed during the reaction, so that some of the hydroxy or amino groups in a polyfunctional starting reactant [e.g. of formula (Va)] may even remain non-reacted. Depending on the molar ratio, on the functionality of the starting hydroxy- or aminocompound and on its configuration—especially if x1 in formula (Va) is 4 to 6—the degree of reaction of the x1 OH groups with epichlorohydrin may vary, and may e.g. be in the range of 50 to 95%, mostly 70 to 90%, of the total number of OH groups originally present in the starting polyol. The obtained adduct is a chloro-terminated product.

The chloroterminated adduct is then reacted with a suitable amine to produce a polyquaternary preferably crosslinked product, e.g. with a crosslinking reactant that is capable of providing a bridging quaternary ammonium group, which suitably is a tertiary oligoamine or a secondary monoamine. Such amines may for instance be reaction adducts of epichlorohydrin with one of the above mentioned primary or secondary amino compounds, or preferably correspond to the following formula

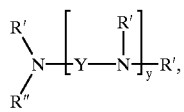
(VI)

in which

Y signifies $C_{2-3}$-alkylene, y signifies a number from 0 to 3,

R' signifies $C_{1-3}$-alkyl or $C_{2-3}$-hydroxyalkyl and

R" has a significance of R', if y is 1 to 3, or signifies hydrogen, if y is 0, especially as a reactant leading to a crosslinking, where the starting oligohydroxycompound is of formula (Va),.

or to the following formula $$N(R')_3 \tag{VII}$$

or

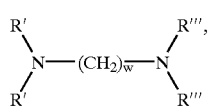
(VIII)

wherein

R'" signifies hydrogen or $C_{1-3}$-alkyl and w signifies a number from 2 to 6, the amines of formulae (VII) and (VIII) being especially suitable as reactants, where the starting oligohydroxycompound is of formula (Vb).

For an optional chain-terminating, quaternizing reaction there may e.g. be employed a tertiary monoamine preferably of formula (VII).

As amino compounds of formula (VI) there may be employed known amines. The $C_{1-3}$-alkyl radicals in R' and R" may be methyl, ethyl, propyl or isopropyl, the lower molecular ones being preferred, especially methyl. The $C_{2-3}$-hydroxyalkyl radicals are preferably 2-hydroxyethyl or -propyl. Among the $C_{1-3}$-alkyl radicals and the $C_{2-3}$-hydroxyalkyl radicals the $C_{1-3}$-alkyl radicals are preferred, especially methyl. The index y may be any number from 0 to 3 preferably 0 to 2, more preferably 0 or 1. Representative amines of formula (VI) are dimethylamine, diethanolamine, tetramethylethylenediamine, tetramethylpropylenediamine, N,N-diethanol-N',N'-dimethylethylenediamine, pentamethyldiethylenetriamine and hexamethyltriethylenetetramine, among which the difunctional amines, in particular the lower molecular ones, are preferred, especially dimethylamine and tetramethylethylenediamine. Representative amines of formula (VII) are trimethylamine, triethylamine and triethanolamine, among which trimethylamine and triethylamine are preferred. In formula (VIII) the index w preferably is 2 or 3. Representative amines of formula (VIII) are N,N-dimethylaminopropylamine, N,N-diethanolaminopropylamine, tetramethylethylenediamine, tetramethylpropylenediamine and N,N-diethanol-N',N'-dimethylethylenediamine.

The polycationic polyquaternary products are polymers at least insofar as either the reaction with the amine leads to a polymer or the starting product is polymeric (e.g. is a polyalkylene glycol) or both.

The molar ratio of quaternizing amine to epichlorohydrin adduct is suitably chosen so that a product of polymeric character is produced. The molar ratio of quaternizing amine to epichlorohydrin adduct to a compound of formula (Va) is preferably chosen so that for every mole-equivalent of adduct referred to chlorine there is employed 0.5 mole of crosslinking amine ±30%, e.g. ±10%. The molar ratio of quaternizing amine to epichlorohydrin adduct of a compound of formula (Vb) is preferably chosen so that for every mole-equivalent of adduct referred to chlorine there is employed 1 mole of amine of formula (VIII) ±30%, e.g. ±10%. The molar ratio of quaternizing amine to epichlorohydrin adduct of a compound of formula (Vb) is preferably chosen so that for every mole-equivalent of adduct referred to chlorine there is employed 0.9 mole of amine of formula (VII) ±40%, e.g. ±20% (if both R''' are hydrogen) or 0.5 mole of amine of formula (VII) ±30%, e.g. ±10% (if both R''' are other than hydrogen) or 0.7 mole of amine of formula (VII) ±35%, e.g. ±15% (if one R''' is hydrogen and the other is other than hydrogen).

The concentration of the reactants is preferably chosen in such a way that the concentration of $(P_A)$ in the aqueous mixture is in the range of 10 to 75%, preferably 20 to 70% by weight.

The reaction of quaternizing amine with the adduct is carried out preferably in aqueous medium and preferably with heating, e.g. at a temperature in the range of 50 to 100° C., preferably 60 to 90° C. During the reaction, at least at the beginning, the basicity of the amine is sufficient for the quaternizing alkylation of the amine with the adduct, i.e. with the chloride used as an alkylating agent. The pH of the reaction mixture is preferably in the range of 4 to 9, at the beginning being preferably in the range of 7 to 9. As reaction proceeds, the alkalinity of the mixture and the concentration of crosslinking amine diminish. If in the reaction product there is present a proportion of covalently linked chlorine which is higher than desired, there may e.g. be added a further reactant which is a monofunctional tertiary amine and/or, if the starting crosslinking reactant is a secondary monoamine, there may be added a suitable strong base, such as an alkali metal hydroxide, preferably sodium hydroxide, so that the pH is preferably maintained in the range of 7 to 9. When the reaction has completed or has reached the desired degree, the reaction mixture is suitably acidified by addition of a conventional acid, preferably a mineral acid (such as hydrochloric acid, sulphuric acid or phosphoric acid) or a low molecular aliphatic carboxylic acid e.g. with 1 to 6 carbon atoms (such as formic acid, acetic acid, citric acid or lactic acid), preferably to reach a pH below 7, more preferably in the range of 4 to 7, most preferably in the range of 5 to 6.5. The progress of the reaction may be followed by checking the viscosity of the reaction mixture, which gives an empirical impression of the degree of crosslinking, i.e. quaternization. A suitable viscosity is e.g. in the range of 200 to 3000 cP.

Preferred polymers $(P_A)$ are:

$(P_{A1})$ epichlorohydrin/amine polymers, $(P_{A2})$ polymers obtained by reaction of epichlorohydrin with oligohydroxyalkanes and further quaternizing reaction with amines, and $(P_{A3})$ polymers obtained by rection of epichlorohydrin with a polyalkyleneglycol and further reaction with quaternizing amines.

Among the above are preferred $(P_{A1})$ and especially $(P_{A2})$.

The produced polymer $(P_A)$, if desired in admixture with another cationic polymer, especially with a cationic starch, e.g. in the weight ratio of the latter to $(P_A)$ of up to 20%, expediently in the form of an aqueous solution, may be combined with a solution of (B). Preferably however $(P_A)$ is not combined with other cationic polymers. According to one feature of this process, the aqueous solution of (B) is added to the aqueous solution of $(P_A)$, preferably stepwise and with heating, e.g. at temperatures in the range of 40° C. to the boil, preferably 40 to 90° C. According to a preferred feature of the process, the solution of (B) is added before polymerisation and/or crosslinking of $(P_A)$ has completed. For the production of a composition from $(P_{A2})$ or crosslinked $(P_{A3})$ it is preferred to add at least a part of the optical brightener (B) before the crosslinking reaction has completed and to add the remaining portion of the solution of (B) during the crosslinking reaction, so that there is obtained an aqueous composition in which the optical brightener anions are the counter-ions to a part of the cations of $(P_{A2})$ or crosslinked $(P_{A3})$ and (B) is also entrained by (or entangled with) $(P_{A2})$ or crosslinked $(P_{A3})$. Similarly, for a derivative of $(P_{A1})$ it is of advantage to add the solution of (B) during crosslinking—e.g. when starting from a secondary amine and, if crosslinking is promoted by the intermediate addition of a strong base, for instance of sodium hydroxide, the optical brightener solution may be added simultaneously with or subsequently to the addition of the base. For the production of a composition derived from non-crosslinked $(P_{A3})$ the solution of the optical brightener may also be added before polymerisation is complete and the entraining (or entangling) of the optical brightener with the polymer is completed with suitable heating. The pH is chosen suitably in such a way that salt-formation of $(P_A)$ with (B) is favoured, expediently in the weakly acidic to distinctly alkaline range, preferably at a pH in the range of 5 to 10, more preferably 5.5 to 9. The ratio of (B) to $(P_A)$ or to its precursor is chosen in such a way that the obtained product $(P_{AB})$ is of cationic character, which means that the number of cations, in particular of quaternary cations, in $(P_A)$ or respectively in $(P_{AB})$ is larger than the number of anions introduced with (B). The ratio of total anionic groups introduced with (B) to the total quaternary ammonium groups in $(P_A)$ or respectively $(P_{AB})$ is e.g. in the range of 2/100 to 60/100. The weight ratio of (B) to $(P_A)$ is chosen accordingly in a suitable way, e.g. in the range of 1/100 to 40/100; the weight ratio of (B) to a suitable precursor of $(P_A)$ is chosen accordingly. The cationicity of $(P_{AB})$, i.e. the amount of quaternary ammonium groups not engaged with (B), expressed in milliequivalents per gram of $(P_{AB})$, is inferior, preferably by at least 0.1 meq/g, to the one of $(P_A)$ and is e.g. in the range of 0.1 to 1.2 meq/g, preferably 0.2 to 1 meq/g, more preferably 0.45 to 0.85 meq/g. The cationicity may be assessed e.g. by means of a "Charge Analyser" fitted with a photoelectric cell, by titration of a 0.1 weight-% $(P_{AB})$-solution with a polyvinyl potassium sulphate solution (e.g. 0.00052N), using Toluidine Blue as an indicator (from blue=cationic to pink=anionic), at pH 4, 7 and 9 (adjusted by means of hydrochloric acid or potassium hydroxide solution).

The rate of addition and the concentration of the components is expediently chosen in such a way that a distinct increment of the viscosity of the obtained solution takes place and the solution of combined product $(P_{AB})$ is still easily stirrable, e.g. of a viscosity below 5000 cP, preferably in the range of 200 to 4000 cP. A suitable concentration for the solution of (B) is in the range of 5 to 70, preferably 10 to 50% by weight. A suitable concentration for the solution of $(P_A)$ is in the range of 10 to 80, preferably 20 to 70% by weight. A suitable concentration for the produced solution of $(P_{AB})$ is in the range of 10 to 90, preferably 20 to 80% by weight. A particularly preferred viscosity for these concentrations is in the range of 500 to 2000 cP. The obtained aqueous composition of $(P_{AB})$ is an aqueous solution, i.e. a true or at least colloidal solution. It may be used directly as produced, or—if desired—it may be modified in salt content and/or concentration e.g. by membrane filtration, and/or it may be combined with any further desired components, e.g.

with an additive that stops the growth of disturbing microorganisms or with a microbicide e.g. in a concentration of 0.001 to 0.1% by weight referred to the liquid composition.

The so produced compositions combine the properties of component (B) as an optical brightener and of component ($P_A$) as an internal or external functional additive in papermaking, for instance as a flocculant, drainage assistant, retention adjuvant or, more preferably, as a fixative. The ($P_{AB}$) composition of the invention provides in particular the possibility of adding the anionic optical brightener at any time before, during or after formation of the paper web or sheet. This means that the multi-functional composition of the invention may be added also in the aqueous stock, without it being necessary to immediately make the paper sheet.

The ($P_{AB}$) composition of the invention are also compatible with other cationic additives or components that might be present or added in the stock, e.g. retention aids and/or cationic surfactants.

A particular feature of the invention is thus represented also by the process for the production of optically brightened paper wherein an aqueous ($P_{AB}$)-solution as defined above is employed as a functional internal or external additive, optionally in the presence of other cationic additives.

The ($P_{AB}$)-compositions of the invention, expediently in the form of aqueous composition as produced by the method described above, serve simultaneously as assistants in the production of paper, in particular as fixatives, for reducing the amount of backwater components, e.g. turbidity, in backwaters (white waters) from paper production, and as optical brighteners for producing optically brightened paper.

The invention thus provides also a method for producing paper, in partticular a paper web or sheet, from aqueous stock, wherein ($P_{AB}$) is employed as an adjuvant, especially as a fixative. As "paper" there is intended herein also paper board and cast paper shapes. As an aqueous stock there is intended any stock, in particular cellulosic stock, as employed for papermaking and wherein the pulp suspension may derive from any origin as conventionally employed for papermaking, e.g. virgin fiber (chemical or mechanical pulp), machine broke (in particular coated broke) and reclaimed paper (especially deinked and optionally bleached reclaimed paper). The aqueous paper pulp or stock may also contain further additions as may be desired for a certain quality, such as sizing agents, fillers, flocculating agents, drainage and/or retention assistants, which are preferably added after the addition of ($P_{AB}$). The stock concentration may vary in any conventional range as suitable for the employed pulp, machine, process and desired paper quality, e.g. in the range of 0.4 to 10%, preferably 0.8 to 6%, by weight of dry pulp. According to a particular feature of the invention there is employed a pulp from coated broke and/or bleached, deinked reclaimed paper optionally blended with other pulp.

The polycationic polymers ($P_{AB}$) are preferably employed in a concentration in the range of 0.05 to 0.5% by weight, more preferably 0.1 to 0.4% by weight referred to dry pulp. The pH may be in the weakly basic to distinctly acidic range, preferably in the range of pH 4 to pH 8, more preferably pH 5 to pH 7. The paper may be produced using any conventional paper making machines and in a manner conventional per se. The resulting backwater is of reduced contaminants content, in particular of reduced turbidity, and consequently the respective BOD and/or COD values are also reduced. By the use of ($P_{AB}$) there may also be achieved an improvement of the efficiency of other cationic wet-end additives such as flocculants, retention assistants or drainage assistants, and there may be obtained paper of optimum quality while the occurrence of paper breakings due to disturbing anionic contaminants is correspondingly reduced, while the efficiency of the optical brightener (B) is optimal and there is obtainable paper of very regular whiteness in high yield. The so produced paper may in particular be employed as a substrate for ink-jet-printing.

EXAMPLES

In the following Examples parts and percentages are by weight, if not otherwise indicated; parts by weight relate to parts by volume as grams to milliliters; the temperatures are indicated in degrees Celsius; in Application Examples C and D ° SR signifies degrees Schopper-Riegler and the percentages relate to the weight of the starting aqueous pulp suspension.

Example 1

109.2 parts of sorbitol are mixed with 55.2 parts of glycerol and heated to 100° C. to form a solution. One part of boron trifluoride etherate is added and the mixture is stirred and cooled to 70° C. 333 parts of epichlorohydrin are added dropwise over one hour at 70–80° C. with cooling.

The reaction mixture is cooled to 20° C. and 135 parts of an aqueous 60% dimethylamine solution are added and the reaction mixture is heated slowly to 90° C. and held for one hour. The reaction mixture is then cooled to 50° C. and 150 parts of 30% sodium hydroxide and 100 parts of a 18.4% aqueous solution of the sodium salt of the optical brightener of formula

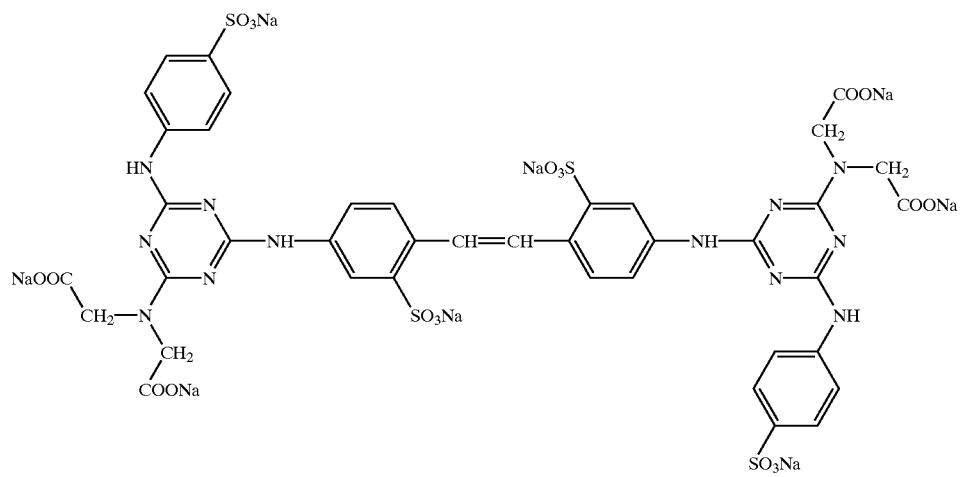

are added. The mixture is held at 50–60° C. and the mixture slowly thickens as it polymerises. During this time further 680 parts of the 18.4% brightener solution are added as the viscosity increases. Finally when the reaction mixture reaches the viscosity of 1000 cP the reaction is stopped by the addition of 10 parts of formic acid to give a pH of 6. The measured cationic charge is 0.7 meq/g.

Example 2

The procedure described in Example 1 is repeated, with the difference that 81.6 parts of pentaerythritol are used in place of 109.2 parts of sorbitol.

Example 3

The procedure described in Example 1 is repeated, with the difference that 37.2 parts of ethylene glycol are employed instead of 55.2 parts of glycerol.

Example 4

The procedure described in Example 1 is repeated, with the difference that 208.8 parts of tetramethylethylenediamine are employed instead of 135 parts of dimethylamine.

Example 5

The procedure described in Example 1 is repeated, with the difference that 110.4 parts of glycerol are employed instead of the mixture of 109.2 parts of sorbitol and 55.2 parts of glycerol.

Examples 6 to 9

The procedure described in Example 1 is repeated, with the difference that there is employed a 20% aqueous solution of the sodium salt of the optical brightener of formula

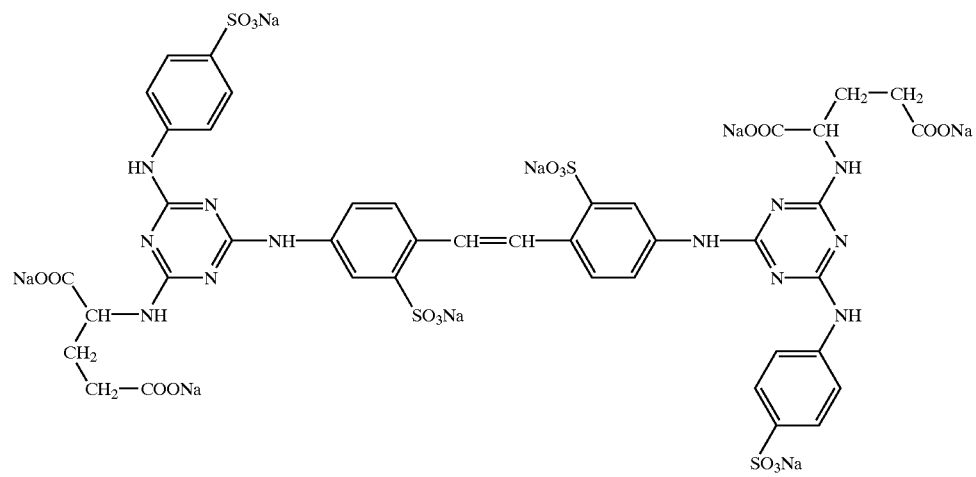

or of the optical brightener of formula

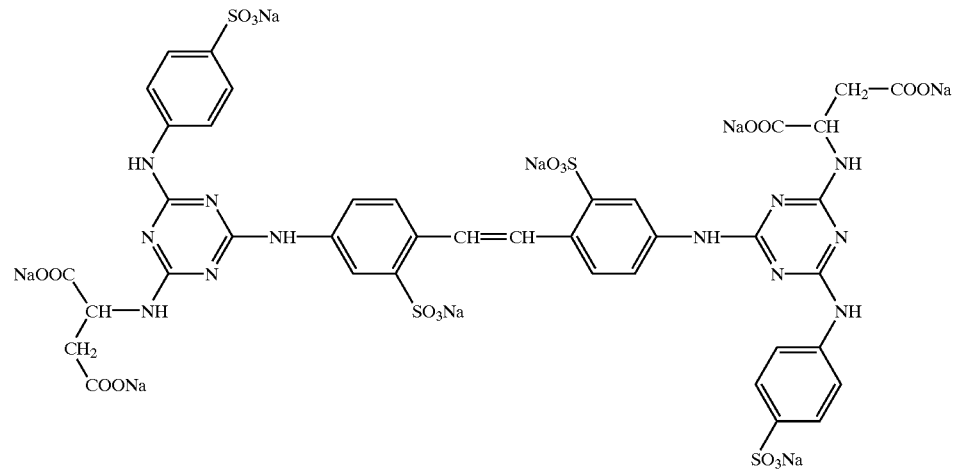

or of the optical brightener of formula

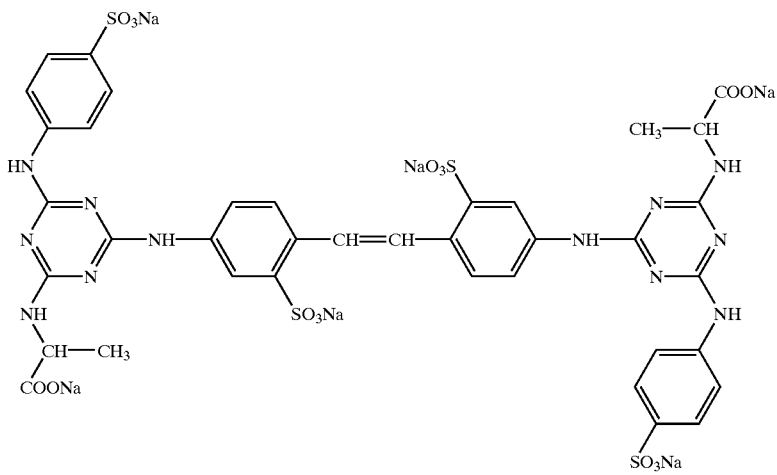
or of the optical brightener of formula
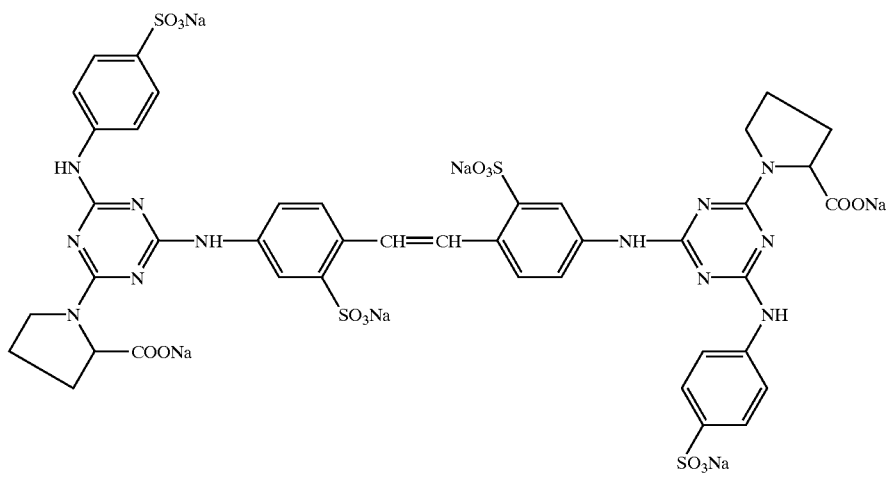
Example 10
The procedure described in Example 1 is repeated, with the difference that there are employed 100 parts of a 23% aqueous solution of the optical brightener of formula
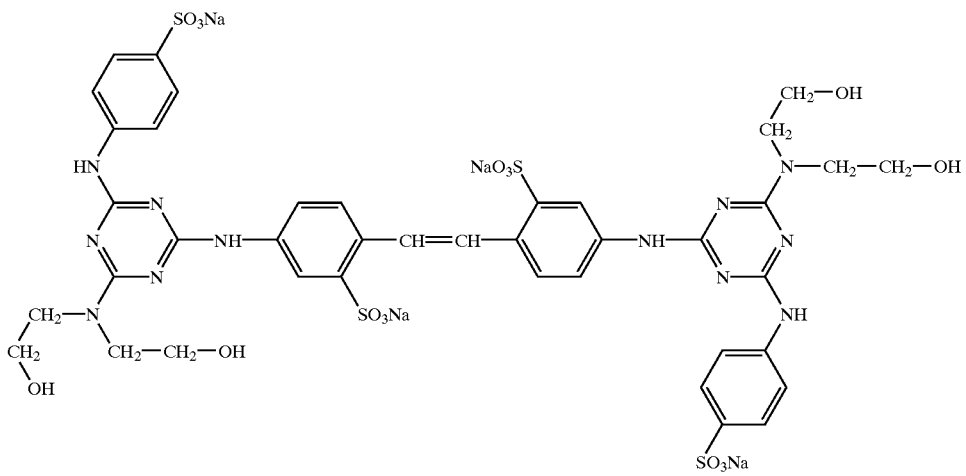

The cationic charge of the product is 0.518 meq/g.

Example 11

The procedure described in Example 1 is repeated, with the difference that there is employed a 12% aqueous solution of the optical brightener of formula

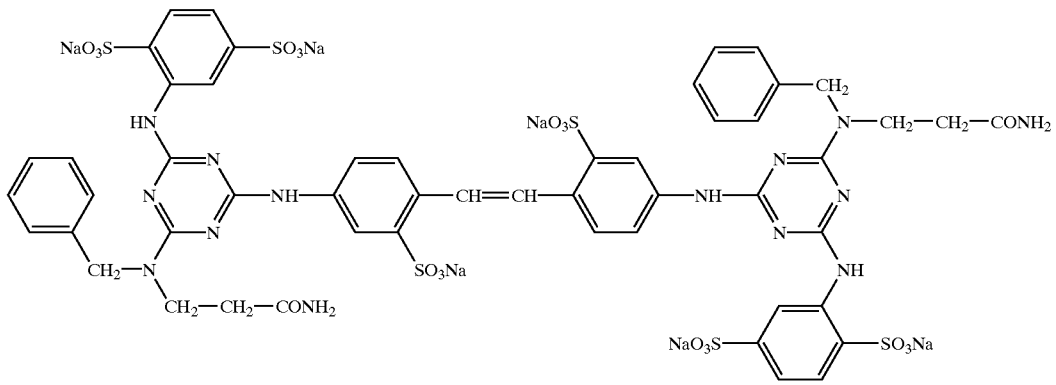

The cationic charge of the product is 0.7 meq/g.

Example 12

The procedure described in Example 1 is repeated, with the difference that there is employed a 12% aqueous solution of the optical brightener of formula

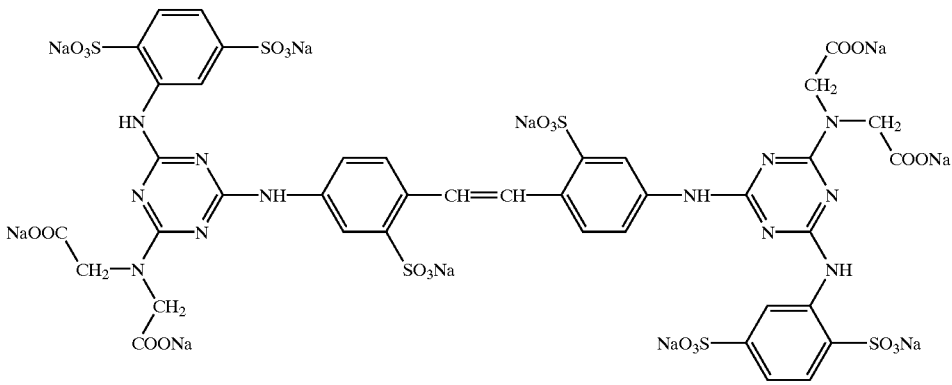

The cationic charge of the product is 0.6 meq/g.

Example 13

1.9 part of boron trifluoride acetic acid complex is added with stirring to 50 parts of polyethylene glycol 400 and the mixture is stirred and cooled to 70–75° C. Stirring is continued for further 30 minutes at 70–75° C., after which 2 parts of epichlorohydrin are added; once an exotherm is observed, further 20 parts of epichlorohydrin are added dropwise over one hour at 70–80° C. with cooling and stirring is continued at 70–80° C. for 30 minutes, after which volatile products are removed by heating to 120° C. under vacuum. The reaction mixture is cooled to 20° C. and 25.3 parts of triethylamine are added and the reaction mixture is heated slowly to 80° C. and held for 3 hours, after which any excess amine is removed under vacuum. The reaction mixture is then cooled to room temperature and 100 parts of a 19% aqueous solution of the sodium salt of the same optical brightener as in Example 11 are added.

Example 14

The procedure described in Example 13 is repeated, with the difference that instead of polyethylene 400 ther is employed the equivalent amount of polyethylene 600.

Example 15

The procedure described in Example 13 is repeated, with the difference that instead of polyethylene 400 ther is employed the equivalent amount of polyethylene 1000.

Example 16

The procedure described in Example 13 is repeated, with the difference that instead of polyethylene 400 ther is employed the equivalent amount of polyethylene 1500.

Application Example A

Sizing solutions are prepared by adding a predetermined amount of the product of Example 1 (0, 1.25, 2.5, 5, 7.5 and 10 mmol/kg referred to the optical brightener) to a stirred aqueous solution of a neutral starch at 60° C. The solution is diluted with water to a starch content concentration of 5%. The sizing solution is poured between the moving rollers of a laboratory size-press and applied to a commercial 75 g/m² neutral-sized (with conventional alkyl ketene dimer), bleached paper base sheet. The treated paper is dried for 5 minutes at 70° C. in a flat bed drier. The dried paper is allowed to condition, then measured for CIE whiteness on a calibrated Datacolor ELREPHO 2000 spectrophotometer. The measured values show a surprisingly high whiteness degree and yield.

Application Example B

A coating composition is prepared containing 3000 parts chalk (fine, white, high purity calcium carbonate with a density by ISO 787/10 of 2.7, commercially available under the trade name HYDROCARB OG of Plüss-Stauffer AG, Oftringen, Switzerland), 1932 parts water, 18 parts cationic dispersing agent, and 600 parts latex (a copolymer of n-butyl acrylate and styrene latex of pH 7.5–8.5, commercially available under the trade name ACRONAL S320D). A predetermined amount of the product of Example 1 (0, 0.313, 0.625, 0.938, 1.25 and 1.875 mmol/kg referred to the optical brightener) is added with stirring to the coating composition, and the solids content is adjusted to 55% by the addition of water. The so prepared coating composition is then applied to a commercial 75 g/m$^2$ neutral-sized (with conventional alkyl ketene dimer), bleached paper base sheet, using an automatic wire-wound bar applicator with astandard speed setting and a standard load on the bar. The coated paper is dried for 5 minutes at 70° C. in a hot air flow. The dried paper is allowed to condition, then measured for CIE whiteness on a calibrated Datacolor ELREPHO 2000 spectrophotometer. The measured values show a surprisingly high whiteness degree and yield.

Application Example C 200 g of a pulp suspension (2.5% aqueous suspension of a 50% mixture of bleached soft wood and hard wood pulps beaten to a freeness of about 20° SR) is measured into a beaker and stirred, 40% filler suspension (80 g of 100 g/litre calcium carbonate suspension in water) is added (typically Sowcall 60 from Croxton and Garry Ltd.). The suspension is stirred for one minute and p % of the product of Example 1 is added (p=0, 0.1, 0.2, 0.4, 0.8, 1, 1.4, 1.8 and 2; p=0 representing the blank). After the addition the mixture is stirred for a further 0.5 minutes and then 1.7% (3.4 g) of neutral size is added (typically a dispersion of 2.5 g of Aquapel 360X in water—Aquapel 360X is an alkylketene dimer size suspension from Hercules Ltd.). After the addition of the size a retention aid may be added—typically Cartaretin PC. The mixture is then diluted to one litre and the paper sheet is formed on a laboratory sheet former (basically this is a cylinder with a wire gauze at the bottom—the cylinder is partly filled with water, the pulp suspension is added, air is then blown through to ensure the pulp is well dispersed, a vacuum is then applied and the pulp slurry is pulled through the wire to leave a paper sheet, this sheet is removed from the wire and pressed and dried). The sheet is left in a humidity cabinet to achieve equlibrium and then the whiteness is measured using a Datacolor ELREPHO 2000 spectrophotometer. The measured values show a surprisingly high whiteness degree and yield.

Application Example D 200 g of a pulp suspension (2.5% aqueous suspension of a 50% mixture of bleached soft wood and hard wood pulps beaten to a freeness of about 20° SR) is measured into a beaker and stirred and 20% filler suspension (40 g of 100 g/litre china clay suspension in water) is added (typically China Clay grade B from EEC Ltd.). The suspension is stirred for one minute and p % of the product of Example 1 is added (p=0, 0.1, 0.2, 0.4, 0.8, 1, 1.4, 1.8 and 2; p=0 representing the blank). After the addition the mixture is stirred for a further 5 minutes and then 2% of rosin size solution is added (typically—'T size 22/30' from Hercules), the mixture is stirred for a further 2 minutes and then 3 ml of alum solution (50 g alum in 1 litre water) are added and the mixture is stirred for a further 2 minutes. The mixture is then diluted to one litre and the paper sheet is formed on a laboratory sheet former. The sheet is left in a humidity cabinet to achieve equlibrium and then the whiteness is measured using a Datacolor ELREPHO 2000 Spectrophotometer. The measured values show a surprisingly high whiteness degree and yield.

Analogously as the product of Example 1, the products of each of Examples 2 to 16 are employed in the above Application Examples A, B, C and D.

What is claimed is:

1. An aqueous solution of a polycationic polymer ($P_{AB}$) containing quaternary ammonium groups in salt form as heteroatomic chain members or ring members of the polymer, wherein a part of the counter-ions to the quaternary cationic groups are anionic groups of anionic optical brighteners, containing at least one anionic group.

2. Process for the production of an aqueous solution of a polycationic polymer ($P_{AB}$) according to claim 1, wherein an aqueous solution of
   (B) an anionic optical brightener in free acid or alkali metal salt form is added to an aqueous solution of
   ($P_A$) a polycationic polymer containing quaternary ammonium groups in salt form as heteroatomic chain members or ring members of the polymer, in which the counter-ions to the cationic quaternary ammonium groups are anions of mineral acids, anions of low molecular carboxylic acids or anions deriving from a quaternizing agent,
in such an equivalents ratio that the quaternary ammonium cationic groups in ($P_A$) are in excess over the anionic groups in (B) and the obtained product ($P_{AB}$) is in the form of an aqueous solution.

3. Process according to claim 2, wherein (B) is added to a precursor of ($P_A$) before completion of polymerisation and/or crosslinking, and the polymerisation and/or crosslinking reaction is completed in the presence of (B), to give a solution of a product ($P_{AB}$) which is a polymer ($P_{AB}'$) that contains (B) in entrained or entangled salt form.

4. Process according to claim 2 wherein the produced solution of ($P_{AB}$) is desalinated by membrane filtration.

5. Process according to claim 2, wherein ($P_A$) is a polycationic, quaternary-ammonium-group-containing polymer selected from:
   ($P_{A1}$) epichlorohydrin-amine polymers,
   ($P_{A2}$) polymers obtained by reaction of epichlorohydrin with oligohydroxyalkanes and further quaternizing reaction with amines,
   and ($P_{A3}$) polymers obtained by rection of epichlorohydrin with a polyalkyleneglycol and further reaction with quaternizing amines.

6. Process for the production of optically brightened paper, wherein an aqueous ($P_{AB}$)-solution according to claim 1 is employed as a functional internal or external additive.

7. Process according to claim 6 for the production of paper from machine broke from paper or non-wovens production.

8. Paper produced by the process according to claim 7.

9. A method of producing a substrate for ink-jet printing comprising the step of:
   producing paper according to claim 8 as a substrate for ink-jet printing.

\* \* \* \* \*